UNITED STATES PATENT OFFICE.

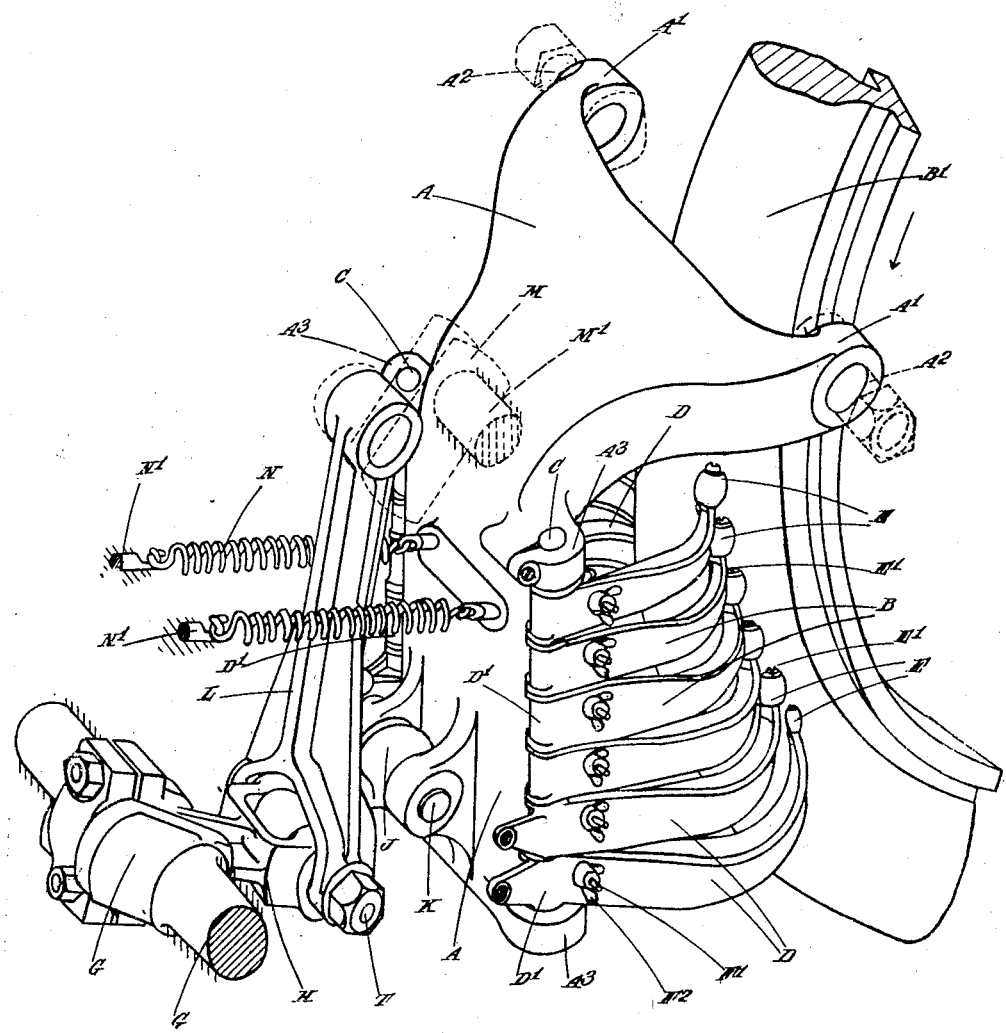

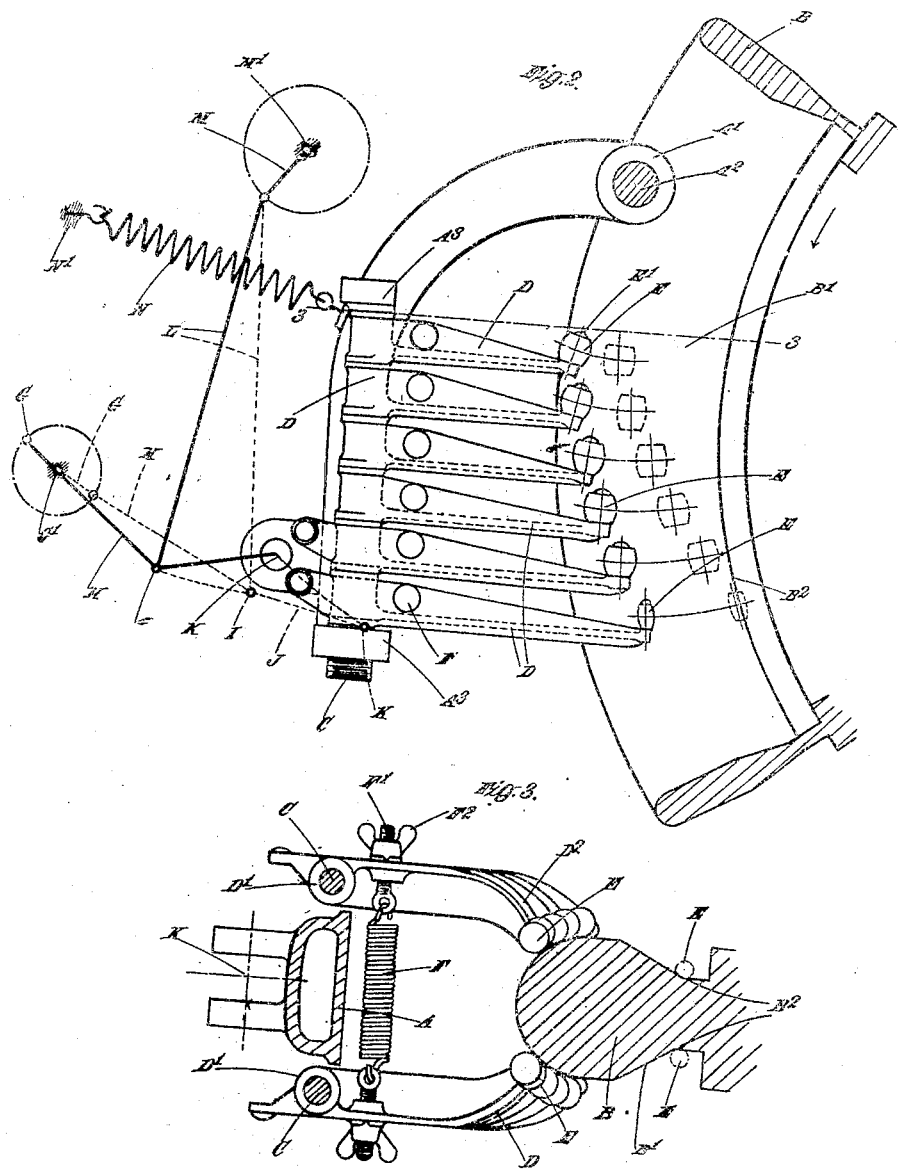

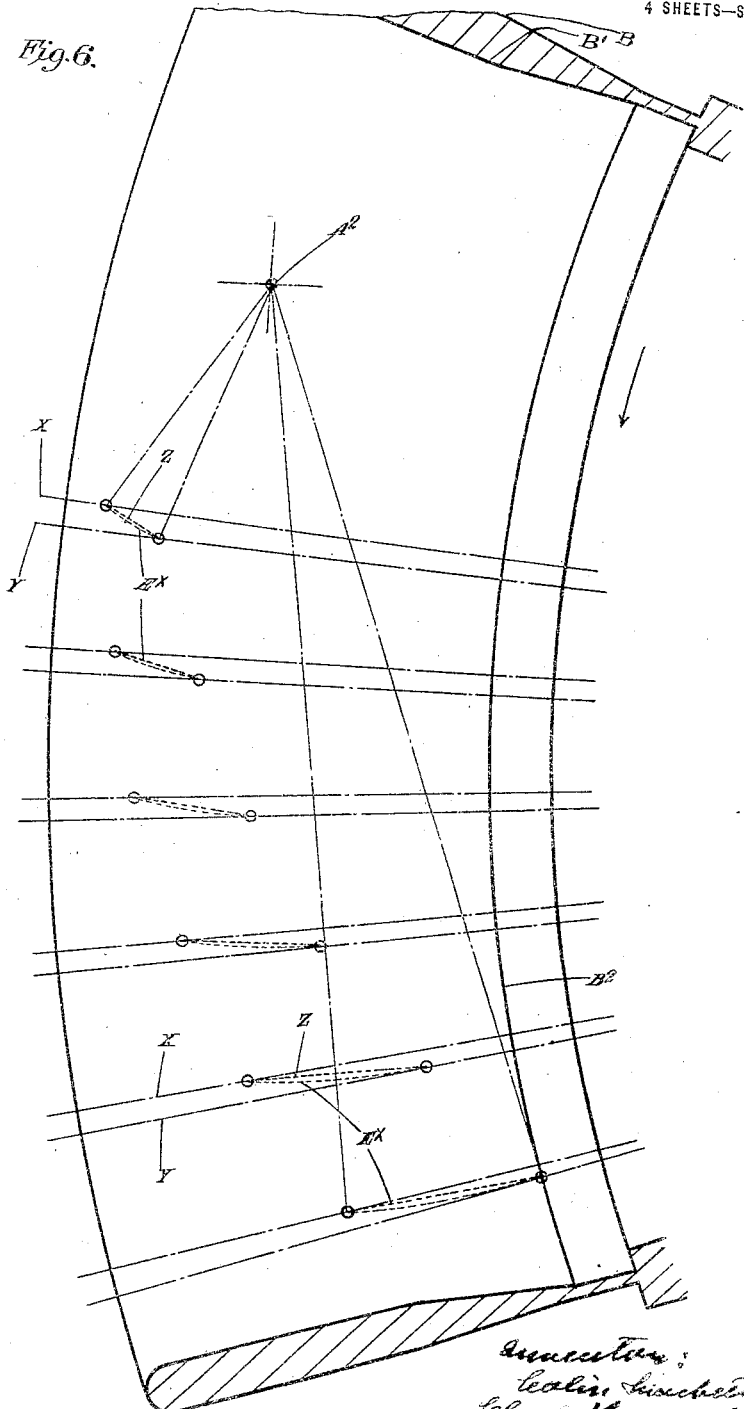

COLIN MACBETH AND CHARLES KENDALL JONES, OF BIRMINGHAM, ENGLAND, ASSIGNORS TO THE DUNLOP RUBBER COMPANY, LIMITED, OF WESTMINSTER, LONDON, ENGLAND.

MACHINE FOR MAKING PNEUMATIC-TIRE COVERS OR CASINGS.

1,331,657.        Specification of Letters Patent.      Patented Feb. 24, 1920.

Application filed May 12, 1919. Serial No. 296,699.

*To all whom it may concern:*

Be is known that we, COLIN MACBETH and CHARLES KENDALL JONES, both subjects of the King of Great Britain, residing at Aston Cross, Birmingham, in the county of Warwick, England, have invented certain new and useful Improvements in or Relating to Machines for Making Pneumatic-Tire Covers or Casings, of which the following is a specification.

This invention relates to machines for making pneumatic tire covers or casings (generally known as case-making machines), the chief object being to provide an improved ply rolling head for correctly laying or stretching the canvas plies of the cover or casing on the core.

It is well known that the canvas plies made up from bias cut strips require to be stretched or deformed in order to correctly form or shape the same for placing on the core. The stretching of the canvas at portions radially outward from the neutral axis of the canvas is in a circumferential direction and the stretching inside the neutral axis is in a radial direction inward.

It is necessary in order to lay the plies correctly on the core that the canvas within the neutral axis should while being laid on be displaced or stretched inwardly toward the center of the core. Heretofore a common arrangement of carrying out this operation has been by means of reciprocating fingers which move in parallel straight lines and have the same length of stroke. In some instances a number of the fingers move in lines which are not parallel to the lines of movement of the other fingers.

It is found that with the reciprocating movement of the fingers and the circumferential movement of the core, there is a tendency for the canvas plies to be creased or puckered at the inner edges near the beads, thus causing defective tires due to the fact that the fingers often used lag behind or overtake the coincident circumferential movement of the core adjacent to such fingers.

According to this invention the fingers during the ply laying stroke are caused to move in paths which are approximately radial to the axis of the core in such manner as to compensate for the circumferential movement of the core, so that the resultant inward stroke of the fingers relatively to the canvas over which they run on the core causes a stretching or displacement of the canvas in an inward radial direction within the neutral axis of the canvas. For this purpose the fingers may be mounted on a bracket or member which is adapted to be oscillated on a suitably disposed pivot the fingers having rollers at their ends so arranged relatively to the point of oscillation of the head and the axis of the core that the rollers move in curved paths which taking into consideration the circumferential movement of the core produces an inward stroke or movement over the canvas on the core which as aforesaid displaces or stretches the canvas in an inward radial direction within the neutral axis. Means may be provided whereby the length of stroke or movement of the rollers may be varied so that after the beads have been applied to the edges of the inner canvas plies the stroke can be reduced to prevent the rollers from coming into contact with the canvas overlaying the beads. The fingers with their rollers may be readily removed and substituted by other fingers and rollers to enable various sizes and sections of tire covers to be dealt with without removing the head; means may also be provided to enable the fingers to exert uniform or equal pressure on both sides of the core; the oscillating movement of the head may be effected in such manner as to insure smooth and noiseless working so as to avoid the necessity for undue use of lubricating oil which is detrimental to the rubbered surfaces on the core.

In order that the said invention may be clearly understood and readily carried into effect, the same will be more fully described with reference to the accompanying diagrammatic drawings, in which:—

Figure 1 is a perspective view of one construction of the oscillating head, and the actuating or driving means for effecting the oscillatory movement.

Fig. 2 is a side view showing the position of the driving means for enabling a long stroke to be imparted to the aforesaid fingers and rollers.

Fig. 3 is a sectional plan view of the oscillating head taken on the line 3—3 of Fig. 2.

Figure 4:
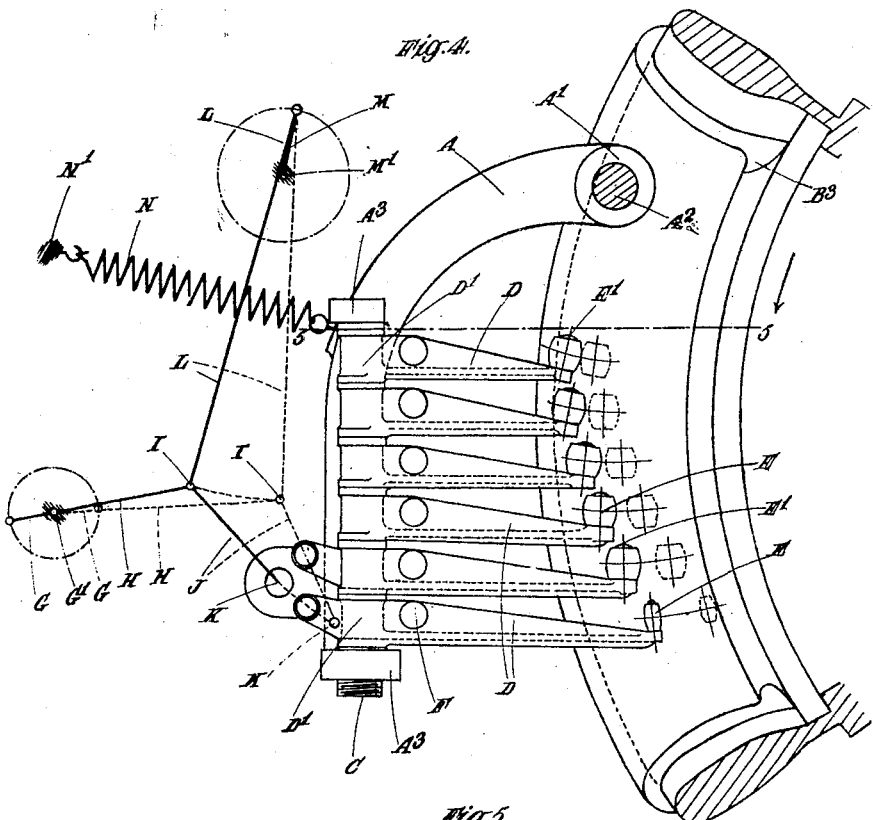

Figs. 4 and 5 are similar views to Figs. 2 and 3, Fig. 4 showing however the driving means adjusted to impart a short stroke to the fingers and rollers.

Fig. 6 is a diagram showing the path of movement of the aforesaid rollers relatively to the core.

A is the main supporting member or bracket of the head; B is a portion of the core which is mounted on a suitable shaft or support so as to rotate in the direction of the arrows. B' is the part of the core on which the inner canvas plies of the casing are placed.

Figure 5:
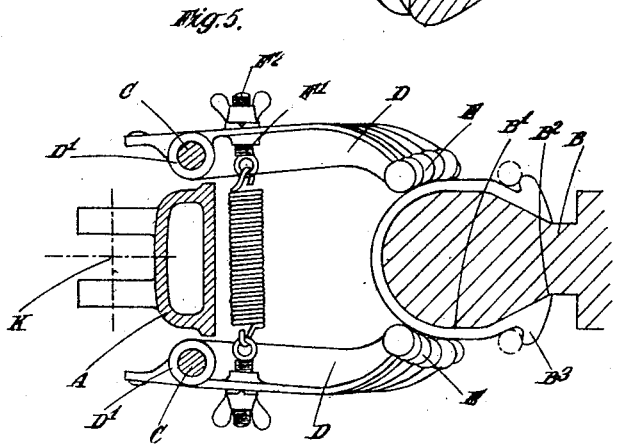

As shown in Fig. 1, the bracket A is straight at its lower part and curved at its upper part, which latter is of somewhat forked or bifurcated form to provide two lugs or bearings A' which extend one on each side of the core, and are mounted on pins $A^2$ supported on the frame of the machine, the pins $A^2$ constituting the point about which the bracket A is oscillated, by appropriate means as hereinafter described. The straight part of the bracket A is disposed a short distance from the core, and on each side of the aforesaid straight part a spindle C is detachably mounted in lugs or ears $A^3$ $A^3$ on the bracket in any appropriate manner. These spindles C each carry a set of fingers D, the individual fingers being provided at their rear ends with eyes or perforated lugs D' to enable them to be placed on or removed from the said spindles, and to be angularly movable thereon. The fingers D are curved toward their forward ends, which latter lie adjacent to each side of the core, as shown in Fig. 3, and are provided with rollers E which are rotatably mounted on pins E', E' secured to the fingers D. The rollers E lie in contact with and on each side of the core, and bear against the same with equal pressure owing to the influence of springs F (see Figs. 3 and 5) connected to and between the corresponding pairs of fingers in the two sets; the springs are adjustable by means of screws F' and wing nuts $F^2$ so that the pressure of any pair of rollers E on the core can be varied by altering the tension of the spring pertaining thereto. The fingers D gradually increase in length from the upper one to the lower one as shown in Figs. 2 and 4, and the pins E' on which the rollers E of each set are mounted are disposed in different angular positions (see Fig. 2) to enable the rollers to effect the desired movement or stroke relatively to the rotating core when the head is oscillated. Any or all of the various fingers D can be readily removed by partially or wholly withdrawing the spindle C and if desired substituting other fingers of different shapes and lengths, having suitably arranged rollers to suit different sizes or sections of tire casings so that it is not necessary to change the complete head.

In the example shown, the oscillation of the bracket carrying the fingers D may be effected by a rotary crank G on a suitably driven shaft G' the crank being connected to a rod H which is pivotally connected at I to a short link J pivotally connected at K to the lower part of the bracket. At the point of connection I is pivotally connected the lower end of the suspension link L whose upper end is pivotally connected to a crank M fixed to a pin M' which can be adjusted and set in any fixed position by any appropriate means for the purpose of varying the position of the point of connection I, and thus enabling the extent of oscillation of the head, and the length of the stroke of the finger rollers E to be varied as desired. Fig. 2 shows the crank M and the point of connection I in such a position that the rotation of the crank shaft G' will effect a long stroke of the rollers so that the lowermost roller of each set will extend to the respective edge of the inner canvas on the core, the dotted lines showing the position of the driving means and the rollers when the latter are at the inward extremity of their strokes. By setting the crank M to the position shown in Fig. 4, the position of the point of connection I is changed without moving the head, so that a shorter stroke is imparted to the head with a resultant shorter stroke to the rollers, the dotted lines in this figure indicating the position of the driving means and the rollers at the inward extremity of the shorter stroke. Two tension springs N, N connected to the bracket A and to suitable parts N' secured to the machine frame, maintain the connecting rod H and the link J in a compressed or collapsed condition, so that the extending movement of the said rod and link to produce the inward movement or stroke of the bracket is effected against the action of the springs N, N and by this arrangement the bracket can be oscillated at a high speed without setting up backlash, thus insuring smooth running and noiseless working and avoiding the undue use of lubricating oil, which it is not wise to employ too near to the rubbered surfaces on the core. Where possible, ball, roller or other oil-less bearings are employed. The springs N, N may be adjustable if desired.

The construction and arrangement of the oscillating head and the driving means as above set forth, enables the oscillatory movement imparted to the head to cause each finger to move in a curved or arcuate path $E^x$, the radius of each curved path being struck from the point of oscillation $A^2$ of the bracket (see Fig. 6) which point is suitably determined and may be situated within the limit of the outer circumference of the core. Owing to the arrangements of the various parts as shown, the resultant path of movement or stroke of each roller corresponds very closely to the theoretical movement required to compensate for the amount of circumferential movement of the rotary core during the inward stroke of the several rollers, thus giving a truly radial stretch to or displacement of the canvas inwardly within the neutral axis thereof during the circumferential movement of the core. The radial lines X—Y shown in Fig. 6 represent the circumferential movement of the core during the period of the inward movement or stroke of each roller, and the straight line Z, forming the chord of each curved line E$^x$ shows how nearly the movement of each roller corresponds to theoretical requirements.

The upper rollers which during the inward stroke do not extend within the neutral axis of the canvas are ply layers only; the lower rollers which during the stroke extend within the neutral axis effect the radial stretching or displacement of the canvas as required within the said axis. The circumferential stretching of the canvas outside the neutral axis may be effected by other means on the case making machine.

Fig. 6 shows the full length of the stroke or inward movement prior to the placing of the beads to the edges of the inner canvas strips, for which purpose the driving means are set to the position shown in Fig. 2. After the beads have been applied, the driving means are set to the position shown in Fig. 4 by suitably adjusting the crank M and the point of connection I as hereinbefore described, with the result that the inward movement is reduced so that the lowermost roller of each set does not extend to the bead and is thus prevented from riding over the bead, and tending to distort the canvas plies placed thereon. The oscillating head may be disposed in any suitable position relatively to the vertical or horizontal diameters of the core, and the arrangement as above set forth shows the point of oscillation situated just above the horizontal diameter of the core, so that normally the fingers D are situated approximately horizontally as shown in Figs. 2 and 4. The head may, however, be so disposed that the fingers are approximately vertical or inclined provided that the rollers on the fingers and the point of oscillation are properly positioned in relation to the center or axis of the core.

What we claim and desire to secure by Letters Patent of the United States is:—

1. In a case making machine, the combination with a core, of a ply rolling head comprising a plurality of fingers adapted to bear against the canvas on the core, and means for causing said fingers during the ply laying stroke to move in paths approximately radial to the axis of the core while the latter is rotating, whereby the canvas will be stretched or displaced in an inward radial direction within the neutral axis thereof.

2. In a case making machine, the combination with a rotary core, of a ply rolling head comprising a body, supported to oscillate about a suitable axis, and a plurality of fingers arranged in such relation to the axis of oscillation of the head and the core as to move in curved or arcuate paths whereby, owing to the circumferential movement of the core, the inward stroke or movement of the fingers stretches or displaces the canvas in a radial direction within the neutral axis thereof.

3. In a case making machine, the combination with a rotary core, of a ply rolling head comprising an oscillating bracket and two sets of fingers extending from said bracket, on opposite sides of the core, and adapted to move in approximately radial paths relative to the axis of the core while the latter is rotating.

4. In a case making machine, the combination with a rotary core, of a ply rolling head comprising a plurality of fingers supported to oscillate so as to move in approximately radial paths relative to the axis of the core while the latter is rotating, and means for varying the extent of oscillation and length of movement or stroke of said fingers, for the purpose specified.

5. In a case making machine, the combination with a core, of a ply rolling head mounted to oscillate to and from the core to properly position a canvas ply thereon, and means for actuating the head comprising a crank, a link pivotally connected to the head, a rod connecting the crank and link, a suspension link having one end connected to the rod and link, and an adjustable crank connected with the other end of the suspension link, substantially as and for the purpose described.

6. In a case making machine, the combination of a core, a ply rolling head comprising a pivotally mounted body and a plurality of fingers detachably connected to the body and adapted to coöperate with the core to displace or stretch canvas on the core in a radial direction relative to the axis of the core and within the neutral axis of the canvas.

7. In a case making machine, the combination of a core, a ply rolling head comprising a pivotally mounted body, adapted to swing about its pivot to and from the core, two spindles removably supported at opposite sides of the body, and a plurality of fingers detachably connected with each spindle and adapted to coöperate with the core to apply a canvas ply thereto.

8. In a case making machine, the combination with a core, of a ply rolling head mounted to oscillate to and from the core, to properly shape a canvas ply to the core, and means for actuating said head comprising a crank, a link pivotally connected to the head, a rod connecting the crank and link, a suspension link having one end connected to the rod and link, and a spring acting to maintain the connecting rod and link attaching it to the head compressed or collapsed so that movement of said rod and link to carry the head toward the core is opposed by the spring.

9. A ply rolling head for case making machines comprising a bracket carrying a plurality of pairs of fingers provided with rollers, adjustable means for driving or oscillating the head so as to impart a long or short stroke to the rollers, a spring for causing the two rollers of each pair to bear on the core with equal pressure, the point of oscillation of the head being such that the rollers move in approximately radial paths relatively to the axis of the core, substantially as and for the purpose specified.

COLIN MACBETH.
CHARLES KENDALL JONES.